March 23, 1971    I. J. TAYLOR    3,572,384
TWO-WAY VACUUM VALVES

Filed June 20, 1968    3 Sheets-Sheet 1

March 23, 1971  I. J. TAYLOR  3,572,384

TWO-WAY VACUUM VALVES

Filed June 20, 1968  3 Sheets-Sheet 3

United States Patent Office 3,572,384
Patented Mar. 23, 1971

3,572,384
TWO-WAY VACUUM VALVES
Ivor John Taylor, 560 Riverside Drive, Apt. 6G,
New York, N.Y. 10027
Filed June 20, 1968, Ser. No. 738,513
Int. Cl. F16k *11/02*
U.S. Cl. 137—625.5         8 Claims

ABSTRACT OF THE DISCLOSURE

The invention relates to two-way valves of a type suitable for use in high vacuum systems. A double acting piston element reciprocates in a cylindrical bore of the valve casing. The piston element has reduced diameter shank portions and O-rings contained within end discs. This shape permits optimum pumping speed through the valve. The piston forms a vacuum seal within detachable end sleeves withdrawable from the valve casing, the sleeve construction enabling high quality vacuum sealing under conditions of extensive use. Reciprocal motion of the piston element is obtained from a rotary movement of an actuating spindle with crank disc. The crank disc is located within a recess in the valve casing to allow absorption of operating stresses by the valve casing and permit the construction of an efficient vacuum sealing arrangement for the spindle. A crank pin and external stops system enables locking of the valve in its operating positions, and an arrangement permitting locking in an intermediate operating position (with all ports mutually closed) is also presented.

---

This invention relates to double acting or two-way valves of the type, hereafter referred to as vacuum valves, which are suitable for use in high vacuum systems.

Objects of the invention include the devising of:

(1) A valve which is double acting to provide (or prevent) communication between a valve port and either of two further valve ports.

(2) A valve of the above form that is sufficiently leak free to be capable of sustained operation in high vacuum systems.

(3) A valve having a quick and single movement operation—this feature being intended to anticipate and meet the requirement of fast switching between vacuum lines by the use of a single valve and which may be involved for instance in production line vacuum testing of various products or in multiple line vacuum systems.

(4) A valve which is locked when set in a desired operating position so that the valve cannot be opened or closed as a result of pressure differentials across the valve ports.

(5) a valve having a simple mechanism of but one rotating and one sliding part.

(6) A valve whose sealing action does not need pressure springs or other such devices and whose locking action is an integral part of the valve's operation.

(7) A valve having large port apertures in relation to its compact size.

(8) A valve whose mechanism and sealing members can be readily removed from the valve body for servicing or replacement.

Existing two-way or multi-port valves are in general designed for fluid control uses and usually employ a piston element sliding in a tube and equipped with ring seals to enable communication between desired ports in the side of the tube as the piston is moved translationally.

Such valves are in general wholly unsuitable for use in high vacuum systems most often because of inadequate sealing of the valve operating mechanism against external leakages into the valve since a valve for high vacuum use has to be extremely leak free.

For example, a leakage totalling 1 cc. of air over a whole day of operation corresponds to an equivalent leakage of 760 million ccs. for a vacuum system operating at $10^{-6}$ torr vacuum or, in other terms, corresponds to a leak rate of more than 7,600 ccs. per second at this pressure of vacuum. Such an enormous leakage could completely overwhelm a vacuum system attempting to produce and maintain this degree ($10^{-6}$ torr) of vacuum.

Modern leak-detection methods at present enable leaks of the order of $10^{-12}$ atmospheric ccs. per sec. to be detected and a valve suitable for use in high-vacuum work necessarily must be leak-free in operation to at least this extent and which is the capability of the valve hereafter described.

In a piston type of valve the piston is generally operated by means of a shaft through the valve body and thus a basic problem for vacuum valves of this type is the elimination of shaft leakage.

A translational movement of a shaft through a seal invariably introduces a leak into the valve due to a combination of two effects. Firstly, when the shaft passes through the seal a quantity of air which was absorbed in the surface layers of the shaft is introduced into the valve. These surface layers then "out-gas" into the vacuum environment. No form of seal which permits direct translational motion of the shaft from air into the vacuum region (however well this seal may be devised) will be able to fully prevent this type of leakage.

Secondary, when a shaft undergoes such translational movement a leakage may occur as the contact between the seal and the shaft momentarily "breaks away" as translational motion is started through the seal.

In general, therefore, valves utilizing a translational movement of a shaft through a seal are basically unsuitable for use as vacuum valves. The contention such valves might be made satisfactory leak-free for many vacuum uses rests in minimising the two effects mentioned above.

Thus, necessarily, the shaft movement should be a small one, a slow one, and one involving a part of the shaft that is well polished and protected to remain clean and scratch free. Any dust or dirt that may accumulate on a part of the shaft projecting beyond the casing in one axial position of the piston is liable, in the other axial position of the piston, to be drawn within the seal and thus further impair the sealing characteristics of the arrangement.

The imposed requirements of a small and slow movement are opposed to the very desirable features of substantial piston movement and quick operation. A substantial piston movement is quite necessary for a valve having large port apertures so that the apertures may be adequately cleared to permit unrestricted flow through the valve and, since under vacuum conditions the flow rate through the valve is proportional to the cubic power of the aperture size, a large aperture is an important requirement for a vacuum valve.

One specific design to overcome shaft problems employs a bellows one end of which is sealed to the piston and the other end to the valve body. The shaft then operates inside the sealed bellows unit and shaft leakage is avoided. Such bellows valves are well known and are extensively used in high vacuum work.

Such valves however have their own inherent disadvantages. The metal bellows material is very thin to obtain the necessary flexibility and should it crack through fatigue effects or corrode away (if corrosive gases are being handled for instance) then once again a shaft leak would ensue.

Methods of "backing-up" the bellows seal have been devised, serving to illustrate that the shaft seal can still be of concern even in this type of valve.

A more apparent disadvantage of the bellows type of valve lies in its operation. The piston is generally actuated by a screw threaded shaft so that the seal within the valve may be made firm and locked. The operation of a screw-threaded shaft is necessarily slow and thus such valves, intrinsically, are not quick acting.

When such valves are made quick acting, as is generally done by means of a cam or toggle mechanism to withdraw the shaft against some form of spring tension, then the firmness of the internal seal depends entirely upon the spring tension. Although now quick acting, such a valve cannot be firmly tightened and is not locked.

The sealing action of a multiport fluid control valve generally relies to a large extent on the pressure of the fluid itself to tighten the seal and thus the internal sealing of such fluid valves is often not established as being tight enough to prevent leakage under conditions of vacuum use.

In the double acting piston valve hereafter described the mechanical advantage of its operating mechanism enables an adequate radial compression of the sealing members to ensure an efficient vacuum seal.

The construction of the valve also readily permits the surfaces involved in the sealing to be made smooth and cylindrical to a high accuracy (as is required for a reliable vacuum seal) and, additionally, to be made so as to minimize wear of the sealing members and assure a long operational life under such conditions.

The above discussion illustrates that the previous stated objects of the invention hereafter described are not met by nor are compatible with existing two-way piston valves for vacuum use.

The following invention provides a manually-operable, double-acting vacuum valve comprising:

(a) A valve casing having a passage extending axially between opposite ends of the casing;

(b) First and second sleeves, each having a cylindrical bore, the sleeves being mounted with their bores in axial alignment in opposite ends of the passag with their inner ends spaced apart and comprising first and second opposed end ports of the valve;

(c) A third port in the casing opening into the passage at a position disposed between the inner ends of the sleeves;

(d) A piston element slidable in the passage in directions parallel to the axes of said bores between first and second extreme positions;

(e) The said piston element having first and second oppositely extending piston portions which when the piston element is in a central position between said extreme positions, extend within the bores of both of the said sleeves to mutually isolate the first, second and third ports and which, when the piston element is in its first or second extreme position respectively are arranged so that the first or second element is in the bore of the first or second sleeve respectively and clear of the bore of the second or first sleeve respectively to place said second or first end port respectively in communication with the third port;

(f) A pair of annular sealing members, one acting between the first piston portion and the bore of the first sleeve and the other acting between the second piston portion and the bore of the second sleeve to provide a vacuum-tight seal between each bore and its associated piston portion when the piston portion extends within the bore;

(g) A valve-operating spindle formed with a crank disc mounted for rotational movement in a wall of the casing at a position centrally disposed between said sleeves and having an outer spindle part projecting outwardly of the casing;

(h) Operating means within the casing connecting the spindle and the piston element between said extreme positions as the spindle is rotated, and such that when the piston element is in either of the said extreme positions it cannot be displaced by pressures in the passage acting on it;

(i) Stop means for limiting the rotational movement of the spindle to that required to displace the piston element between said two extreme positions;

(j) A cover plate secured to the casing and through which the spindle extends; and (k) A sealing ring held against rotational movement and interposed between the cover plate and the spindle to provide a vacuum seal between the cover plate and the spindle.

It will be seen that the invention provides a simple valve in which a single piston element serves to place one or other of two end ports into communication with the third (centrally positioned) port by a simple rotational movement of the spindle.

Also, by reason of the aforementioned characteristics of the operating means, the piston element is retained in one or other of its extreme positions by the said operating means itself, despite pressure differentials to which the piston element may be subjected with the casing.

The operating means includes a crank pin carried at the inner end of the operating spindle and the stop means serves to limit rotation of the operating spindle to rotation between two dead-centre positions of the crank pin, which dead-centre positions themselves serve effectively to prevent axial displacement of the piston element resulting from pressure differences within the valve.

The provision of a rotational means of operating the piston element, as opposed to an arrangement in which the piston element is provided at one end with a reciprocating plunger means slidable through a sealed aperture of the casing, not only facilitates the provision of the single piston element with a piston portion at each end to effect valve operation, but also readily enables the use of a piston shape which is favourable to obtaining minimum restriction to flow through the valve.

In addition, the said rotational means of operation enables the attainment of a far more efficient vacuum seal for the operating means than would be possible if the piston element was controlled by a plunger sliding through a sealed aperture in the casing.

The only relative movement between the sealing member and the spindle is a rotational movement involving but a small region of the spindle, and the cylindrical surface of the part of the spindle extending within the seal may be specially finished to form as perfect a cylindrical surface as practicable and thus have a high surface polish so as to provide optimum vacuum sealing of the said spindle.

By accurately locating and rotationally mounting the spindle's crank disc in a wall of the casing the spindle is well supported to resist the forces acting upon it when the valve is operated. The spindle need only project a short distance beyond the outer face of the cover plate so that the forces acting transversely upon the spindle and tending to radially deform the sealing member are minimized so that the effectiveness of the vacuum seal around the spindle is further assured. Also the part of the spindle extending within the seal may be of small diameter so that relative (rotary) movement of the spindle in the vacuum seal is maintained small.

Further protection of the effectiveness of the vacuum seal around the spindle is obtained by locating the sealing member in an annular groove surrounding a bore in the cover plate, the spindle passing through the bore and the cover plate being detachably mounted on the valve casing so as to retain the spindle within the valve casing.

The arrangement is such that the spindle, the sealing member and the cover plate form a separate sub-assembly which can be positioned and removed without disturbing the relative positions of the other parts of the valve or of the parts involved in the vacuum sealing of the spindle. The sub-assembly also includes the operating means, the stop means, and a handle or other means for rotating the spindle.

Also, with the sealing member contained within a groove in the cover plate, the spindle may be initially inserted into its seal with minimum risk of damaging (i.e. scratching or marking) the specially finished and polished surface of the spindle, and hence there is little risk of damaging or impairing the vacuum seal during assembly of the component parts.

Further efficiency in the vacuum sealing of the spindle is effected by making the aforementioned annular groove of wedge (i.e. wide "V") shape in cross section and by using an O-ring sealing member—for reasons as are hereafter more particularly explained.

Two embodiments of the invention will now be described in detail with reference to the accompanying drawings in which.

Figure 7:
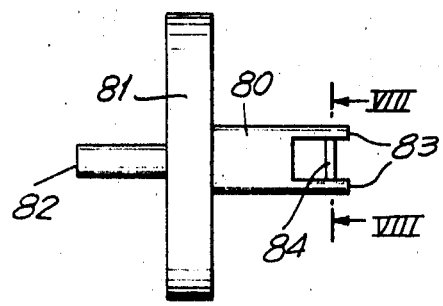
FIG. 7 is a detail elevation of a modified form of operating spindle.
Figure 8:
FIG. 8 is a transverse section on the line VIII—VIII of FIG. 7.
Figure 9:
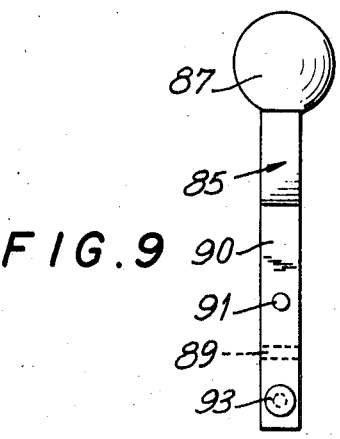
Figure 10:
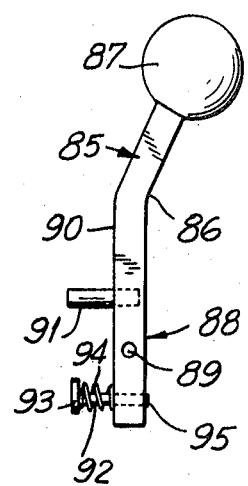
Figure 11:
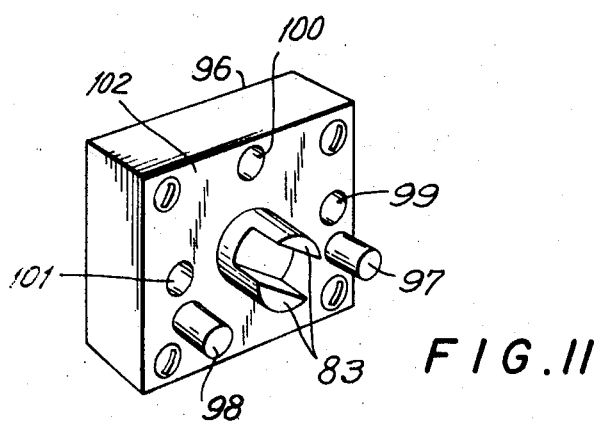

FIGS. 9 and 10 are front and side elevations of an operating handle for the spindle of FIGS. 7 and 8; and FIG. 11 is a perspective view of a sub-assembly comprising a cover plate and the operating spindle of FIGS. 7 and 8 for use with the handle of FIGS. 9 and 10.

Referring to FIGS. 1 to 6, the valve comprises a casing indicated generally at 20 which is of rectangular section and which has a passage 21 extending between opposite ends thereof. The passage has a generally cylindrical wall 22 and is counterbored at each end to provide a cylindrical recess 23. Inserted into each end of the passage 21 is a cylindrical sleeve, the sleeves being similar. A first sleeve is indicated generally at 24 and has a cylindrical bore 25, a smaller diameter portion 26 which fits within the cylindrical wall 22 and a larger diameter portion 27 which fits within the recess 23. An O-ring seal 28 is trapped between a shoulder 29 at the base of the counterbore 23 and a shoulder 30 between the portions 26 and 27 of the sleeve to vacuum seal the sleeve to the valve body. A second sleeve indicated generally at 31 has a cylindrical bore 32, is identical to the sleeve 24 and is mounted in the end of the passage in similar manner.

The sleeve 24 is retained in the end of the passage by means of a threaded coupling indicated generally at 33 which has a flange 34 secured to the end of the casing by screws 35. The flange is vacuum sealed to the end of the casing by means of a ring seal 36 received in a groove 37 in the face of the flange and engaging the end face of the casing. Similarly, the sleeve 31 is retained in position by a coupling 38 which is in all respects similar to the coupling 33. The sleeve 24 comprises a first end port for the valve and the sleeve 31 a second end port. It will be seen that the inner ends of the sleeves 24 and 31 are spaced apart and, centrally between them the cylindrical wall 22 of the passage 21 is apertured to provide a port 39 which communicates with the passage 21, this port 39 being a third port. The port is associated with a threaded coupling 40 which is similar to the couplings 33 and 38 and is secured and vacuum sealed to the wall 41 of the valve casing in similar manner.

Figure 3:
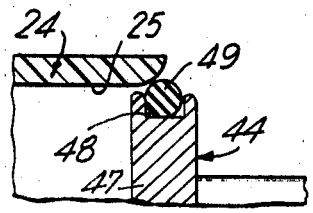
FIGS. 3 and 4 are detail sections showing the sealing of the piston element in a sleeve.
Figure 4:
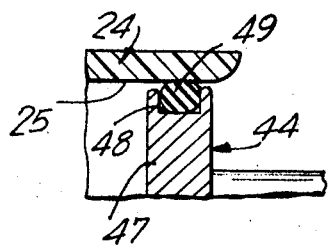
Figure 5:
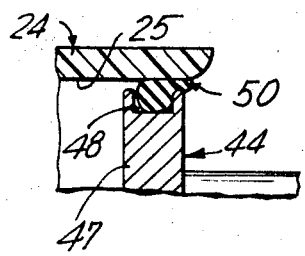
FIG. 5 is a detail section similar to FIGS. 3 and 4 showing the construction to be avoided.

Mounted within the passage 21 is a piston element indicated generally at 42. The piston element comprises a central cylindrical portion 43 which is a sliding fit within the passage 21 and which has piston portion 44 and 45 secured to said central cylindrical portion 43 by stems 46. The stems are of substantially lesser diameter than the piston portions 44 and 45 and the central cylindrical portion 43. Referring to FIGS. 3 and 4, the piston portion 44 comprises a disc 47 having a peripheral groove 48 which houses an O-ring 49. The O-ring, when uncompressed, extends from the groove as shown in FIG. 3 and has slightly greater diameter than the internal diameter of the bore 25 of the sleeve 24. When the O-ring is within the sleeve as shown in FIG. 4, it is compressed so as to form a vacuum seal between the bore 25 of the sleeve and the piston portion 44.

For the O-ring 49 to form a successful vacuum seal various requirements have to be met as will be described below but primarily the O-ring must be of sufficient hardness so that it does not extrude (as indicated at 50 in FIG. 5) between the disc 47 and the bore 25 as the piston portion is forced into the bore. For this reason it is preferred to use an O-ring made of neoprene or butyl rubber of 60 to 70 Shore (durometer) hardness, and lightly lubricated with vacuum grease. Also, since frictional wear on the O-ring increases with O-ring hardness, it is necessary for the insert sleeves to have low frictional properties with relation to the O-ring material. This aspect is later described more fully.

The piston portion 45 similarly comprises a disc 51 having a peripheral groove in which is mounted an O-ring seal 52 to vacuum seal with the bore 32 of the sleeve 31.

Figure 1:
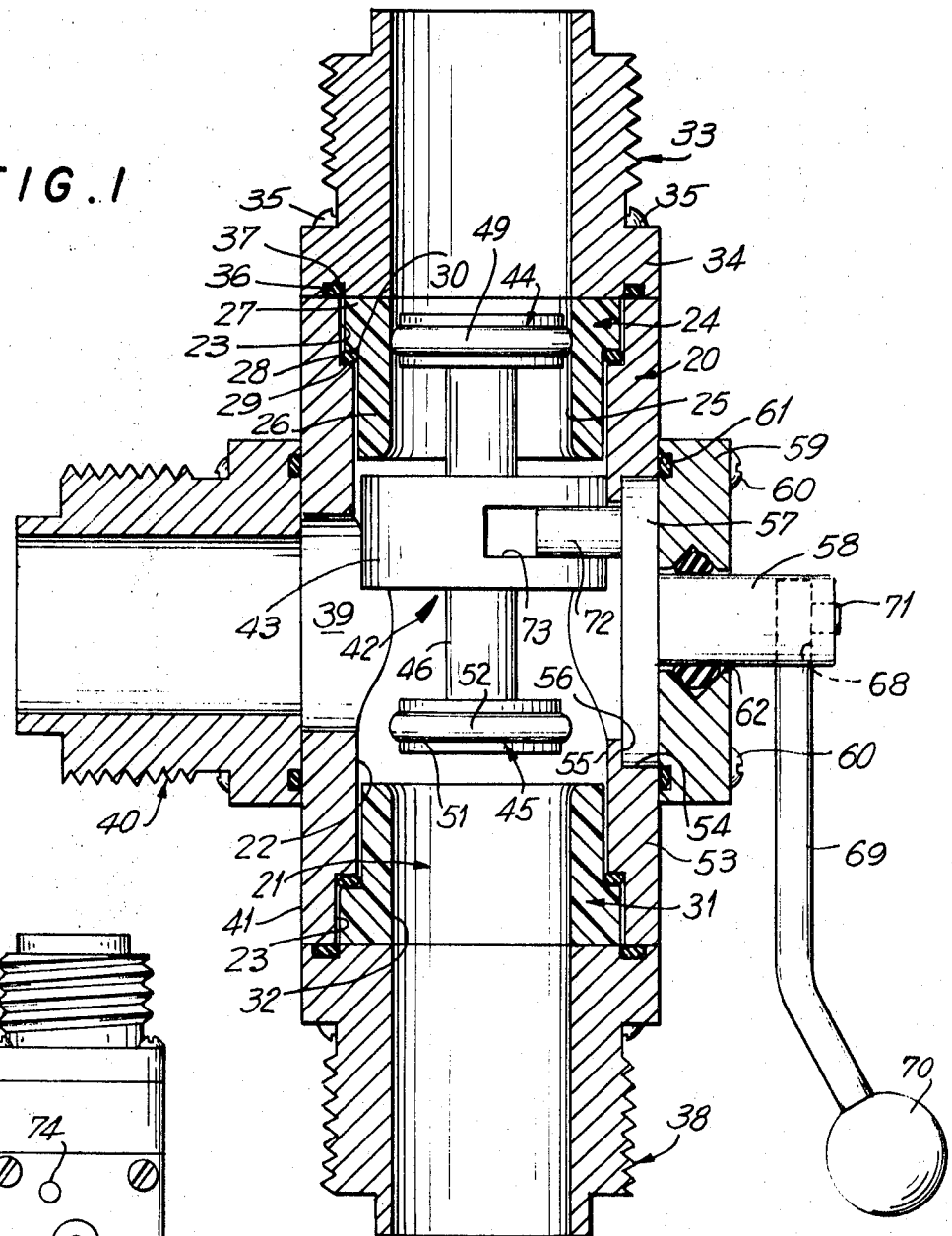
FIG. 1 is a section through a double-acting vacuum valve constituting a first embodiment of the invention.

The piston element is reciprocable in the casing between two extreme positions and is shown in a first extreme position in FIG. 1 in which the piston portion 44 is within the bore 25 of the sleeve 24 and the piston portion 45 is clear of the bore 32 of the sleeve 31 so that the port 39 is in communication with the bore 32. In its other (or second) extreme position, the piston element is arranged so that the piston portion 45 is within the bore 32 of the sleeve 31 and the piston portion 44 is then clear of the bore 25 of sleeve 24 and the bore 25 communicates with the port 39. The piston element is so dimensioned that either the first piston portion 44 is within the first sleeve 24, or the second piston portion 45 is within the bore 32, or, in the central position of the piston element, the first and second piston portions 44 and 45 are both respectively sealed in the bores 25 and 32 of the first and second sleeves 24 and 31. In addition to the central portion 43 sliding within the passage 21, at least one end of the piston element is always guided by engagement of a piston portion in the bore of a sleeve and in the central position both ends of the piston element are guided. In this central position, the port 39 is isolated from each of the couplings 33 and 38 and these in turn are isolated from each other by the piston element. It follows that as the piston element is moved from its first extreme position to its second extreme position, all the ports will be mutually isolated before communication is opened between the central port 39 and the bore 25. Similarly on moving from its second extreme position to its first extreme position, all the ports will be mutually isolated before communication is established between the central port 39 and the bore 32.

Since the movement of the piston element is guided in the above manner, it is possible to have a simple operating mechanism which will now be described.

Figure 6:
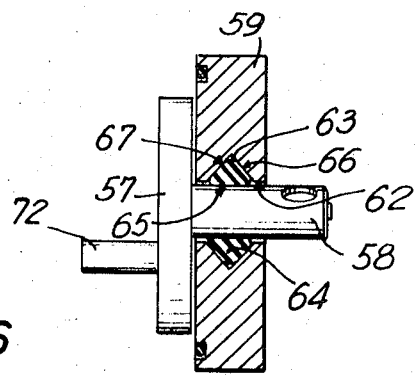
FIG. 6 is a detail section showing the sealing of the operating spindle.

Formed in the wall 53 of the casing is a recess 54 which is separated from the passage 21 by a lip 55 which presents an outwardly facing shoulder 56. Mounted closely within the recess 54 and on the shoulder 56 is a crank disc 57 which forms the inner end of an operating spindle 58. The crank disc is located transversely by the shoulder 56 and by a cover plate 59 which is secured to the wall 53 by screws 60 and vacuum sealed to the wall by a ring seal 61. The cover plate is provided with a bore 62 through which the operating spindle 58 passes. Referring now to FIG. 6, the bore 62 is provided with a peripheral groove 63 which is of V-section and whose apical angle is approximately 90°. Seated in the groove is an O-ring 64 which forms a vacuum seal between the operating spindle 58 and the cover plate 59. It will be seen from FIG. 6 that the O-ring is deformed to have a generally triangular cross section so that it seals with the spindle in a zone 65 and it seals with the walls of the groove in zones 66 and 67 thus forming two separate seals with the cover plate. This helps to increase the frictional contact of the O-ring to the cover plate, thus ensuring that the only relative motion in the seal is between the smooth spindle surface and the O-ring sealing member.

The spindle is provided at its outer end with a blind hole 68 in which is received an end of a handle 69 having an operating knob 70 at its free end. The handle 69 is held in position by a set screw 71.

Figure 2:
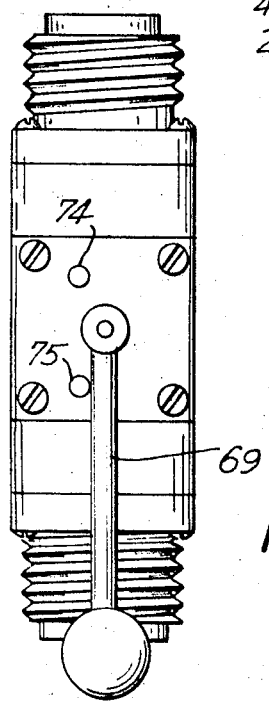
FIG. 2 is an external elevation of the valve of FIG. 1.

The crank disc 57 carries a crank pin 72 and this crank pin is received in a slot 73 in the central cylindrical portion 43 of the piston element. When the operating spindle is rotated, the crank pin 72 moves across the slot 73 in the central portion 43 and causes reciprocation of the piston element. The reciprocation of the piston element is limited to movement between its two extreme positions as the rotation of the spindle is limited by two stops 74 and 75 on the cover plate as shown in FIG. 2. When the handle is in the position shown in FIGS. 1 and 2, the piston element is in its first extreme position and the crank pin 52 is in a first dead centre position. It follows that, due to the dead centre position of the crank pin 72, the piston element cannot be moved within the passage by any pressure difference which may exist across it. The only way in which the piston element can be moved is by rotation of the handle 69.

It will be seen that this means for reciprocating the piston element positively locks the piston element in each of its extreme positions.

By securing the handle in blind hole 68, the handle serves to indicate the appropriate open position of the valve by its relation to the limit stops 74 and 75. The operating position of the valve is otherwise not readily apparent to the user.

In the embodiment thus far described, when the piston element is in a central position with the piston portions 44 and 45 engaged in the bores 25 and 32 of the sleeves 34 and 21, the piston element is in an unstable position and may be moved from this position by differences in pressure across it. FIGS. 7 to 11 show a further form of operating means which may be used when it is desired to hold the piston element in the central position against the action of pressure differences which may be across it, and thus obtain a valve having three locked operating positions.

The modified valve is identical to the valve shown in FIGS. 1 and 2 except for the operating mechanism, i.e. spindle, cover plate, crank disc and crank pin. These differ as will now be described with reference to FIGS. 7 to 11. Referring to FIGS. 7 and 8, the spindle 80 has a crank disc 81 secured to its inner end and the crank disc carries a crank pin 82. The outer end of the spindle is slotted to provide two spaced limbs 83 and extending between these spaced limbs is a pivot pin 84.

The handle of the valve, shown in FIGS. 9 and 10, comprises a bar 85 of square cross section which is conveniently bent at 86 and which carries a knob 87 at one end. The portion 88 of the handle is dimensioned to fit between the limbs 83 and is provided with an aperature 89 to receive the pivot pin 84. Projecting from the surface 90 of the handle is a locating pin 91 and a spring loaded pin 92 having a head 93 and a spring 94 is interposed between the head 93 and the surface 90. The shank 95 of the pin is slidably mounted in an aperture in the portion 88 of the handle.

The spindle of FIGS. 7 and 8 and the handle of FIGS. 9 and 10 are assembled together and are associated with a cover plate 96 shown in FIG. 11 which is provided with two stops 97 and 98 and also with three holes 99, 100 and 101 to receive the locating pin 91. The spindle 80 is mounted in the cover plate 96 in a manner similar to that described in relation to the spindle 58 and the cover plate 59 and as shown in FIG. 6.

It will be appreciated that when the handle is mounted on the spindle 80, the action of the spring 94 will tend to force the end of the locating pin 91 against the surface 102 of the cover plate. The handle can thus be held in three positions by engaging the locating pin 91 in any one of the holes 99, 100 and 101. When the locating pin is engaged in one of the holes 99 or 101, the piston element will be held in one of its extreme positions and against the stop 97 or 98.

When the locating pin 91 is received in the hole 100, the piston element is held in its central position with the piston portions 44 and 45 engaged in the bores 25 and 32 respectively thus mutually isolating all the valve ports, and enabling the locking of the valve in this (third) operating position.

There are various advantages of the above constructions which will now be discussed. Firstly as the spindle, cover plate and handle in each valve forms a sub-assembly, a valve can be changed from a two-position valve as shown in FIGS. 1 and 2 to a three-position valve as described with reference to FIGS. 7 and 11 merely by removing the sub-assembly of cover plate, operating spindle and crank disc and replacing it with a sub-assembly constructed as described with reference to FIGS. 7 to 11.

The casing is preferably made of rectangular section since, for a small overall size of valve, it enables the largest port diameters to be obtained.

It will be seen that the sleeves 24 and 31 are readily removable for possible servicing or replacement by removing the couplings 33 and 38. This easy removal facilitates complete dis-assembly of the valve.

Furthermore, since the sleeves 24 and 31 are separate from the valve casing, it is comparatively easy to obtain a smooth and high quality finish within the bores which is very necessary for an efficient vacuum seal. The desired tapered entrance to the bores is also more readily obtained in this manner.

The sleeves may also be made from a material which is different to that of the valve casing. Normally the casing would be constructed from metal although where intended for handling corrosive gases for instance, the body could be made of synthetic plastics material. The material from which the sleeves 24 and 31 are made is however separately and specifically chosen to give an efficient vacuum seal.

The mechanical advantage of the operating mechanism of the valve embodiment described is approximately 7:1 for a conveniently short length of operating handle, and this readily permits a reasonably hard O-ring to be forced within the bore of the sleeves and compressed to form a tight seal. The use of a reasonable hard O-ring is required to avoid extrusion on entering the sleeve as mentioned earlier.

Frictional wear is the normal limitation on the satisfactory use of O-rings in sliding seals and, since the frictional wear increases with the O-ring hardness, it is advantageous to make the sleeves from a material having low frictional properties in relation to the O-ring sealing members.

A preferred material for the sleeves is thus nylon or a material such as Teflon or P.T.F.E. (registered trademarks for polytetrafluorethylene) which has extremely low frictional properties and which, by also having a low vapour pressure, is a very satisfactory material for vacuum use.

With the use of such insertable sleeves constructed in this manner the wear and damage of the O-ring sealing members is minimal and a high quality vacuum seal may be obtained.

It will be noted that the piston element is of "dumbbell" shape and the width of the central portion 43 is kept to the minimum compatible with the provision of the slot 73 to receive the crank pin 72. The stems 46 are also of substantially reduced diameter. This shape of piston element provides minimum impedance to flow past the piston portions and through the valve.

It will be seen that the invention provides a simple, double-acting valve of a type suitable for use in high-vacuum systems and easily convertible from a two-position switching valve to a three-position valve.

What I claim is:

1. A double-acting vacuum valve comprising:
   (a) a valve casing having a passage extending axially between opposite ends of the casing;
   (b) first and second sleeves, each having a cylindrical bore, the sleeves being mounted with their bores in axial alignment in opposite ends of the passage with their inner ends spaced apart, the sleeves comprising the first and second opposed end ports of the valve;
   (c) a third port in the casing opening into the passage at a position centrally disposed between the inner ends of the sleeves;
   (d) a piston element slidable in the passage in directions along the axis of said bores and between first and second extreme positions;
   (e) the said piston element having first and second oppositely extending piston portions which when the piston element is in a central position between said extreme positions, extend within the bores of both of said sleeves to mutually isolate the first, second and third ports and which, when the piston element is in its first or second extreme position respectively are arranged so that the first or second portion is in the bore of the first or second sleeve respectively and both portions are clear of the bore of the second or first sleeve respectively to place said second or first end port respectively in communication with the third port;
   (f) a pair of annular sealing members, one acting between the first piston portion and the bore of the first sleeve and the other acting between the second piston portion and the bore of the second sleeve to provide a vacuum-tight seal between each bore and its associated piston portion when the piston portion extends within the bore;
   (g) a valve operating spindle comprising a crank disc located for rotational movement within a recess in a wall of the casing at a position centrally disposed between said sleeve members and having a short section of reduced diameter stem extending through a detachable cover plate secured to the casing, which cover plate retains said crank disc in said recess;
   (h) operating means within the casing connecting the spindle and the piston element to effect reciprocating motion of the piston element between said extreme positions as the spindle is rotated, and such that when the piston element is in either of said extreme positions it cannot be displaced by pressures in the passage acting on it;
   (i) stop means for limiting the rotational movement of the spindle to that required to displace the piston element between said two extreme positions;
   (j) a sealing ring held against rotational movement and interposed between the cover plate and the spindle to provide a vacuum seal between the cover plate and the spindle.

2. A valve according to claim 1 wherein the cover plate carries stops for engaging a handle connected with the spindle stem to limit rotation of the spindle to corresponding dead centre positions of the crank pin, which positions define the extreme positions of the piston element.

3. A valve according to claim 1 where a handle is pivotally mounted on the outer end of said spindle and is provided with a locating pin arranged to enter any one of three holes provided in the cover plate, said holes corresponding to the extreme and central positions of the piston element respectively, and spring means acting on the handle tending to urge said pin into said holes, the handle being pivotable against said spring means to dis-engage the pin from a hole and to allow rotation of the handle.

4. A valve according to claim 1 wherein the piston element comprises a central cylindrical portion which is slidable in said passage and is connected to said piston portions by stems having a diameter substantially less than that of said piston portions and less than that of said central cylindrical portion.

5. A valve according to claim 1 wherein said sleeves are withdrawable from said passage through the ends thereof.

6. A valve according to claim 1 wherein the operating means comprises a crank pin carried at the inner end of the crank disc and engaging within a slot in a central cylindrical portion of said piston element.

7. A valve according to claim 1 wherein the sealing ring is an O-ring mounted in an annular V-groove surrounding a bore in the cover plate, the cover plate and spindle forming an assembly unit containing the stop means and the operating means of the valve.

8. A valve according to claim 1 wherein said sleeves are vacuum sealed to the valve casing by O-rings contained between shoulder portions on said sleeves and a counterbored recess in the ends of said valve casing, and wherein said sleeves are contained within the valve passage by end couplings secured to the valve.

References Cited

UNITED STATES PATENTS

| | | | |
|---|---|---|---|
| 2,445,505 | 7/1948 | Ashton | 137—625.5X |
| 2,662,721 | 12/1953 | Giauque | 137—625.5X |
| 3,403,700 | 10/1968 | Meynell | 251—288X |
| 2,537,798 | 1/1951 | Smith | 251—260 |
| 3,218,026 | 11/1965 | Roy | 251—317 |
| 3,476,359 | 11/1969 | Newell | 251—260 |

FOREIGN PATENTS

| | | | |
|---|---|---|---|
| 1,006,229 | 4/1957 | Germany | 137—625.5 |
| 531,346 | 11/1957 | Belgium | 251—260 |
| 629,760 | 4/1927 | France | 251—99 |

M. CARY NELSON, Primary Examiner

M. O. STURM, Assistant Examiner

U.S. Cl. X.R.

251—260